United States Patent [19]

Frangesh

[11] Patent Number: 4,594,626
[45] Date of Patent: Jun. 10, 1986

[54] AIR FILTRATION SYSTEM FOR ROTATING DISK DRIVES HAVING RECIRCULATING AIR FLOWS

[75] Inventor: Thomas P. Frangesh, Campbell, Calif.

[73] Assignee: Xerox Corporation, Stamford, Conn.

[21] Appl. No.: 579,313

[22] Filed: Feb. 13, 1984

[51] Int. Cl.⁴ .................. G11B 5/012; G11B 15/64; G11B 17/32

[52] U.S. Cl. .................. 360/97; 360/102; 360/103

[58] Field of Search .............. 360/102, 103, 97–99, 360/100, 133, 137, 86; 307/400; 55/155, DIG. 39

[56] References Cited

U.S. PATENT DOCUMENTS

| | | | |
|---|---|---|---|
| 3,386,227 | 6/1968 | Czerwonka | 55/155 |
| 3,680,287 | 8/1972 | Wood et al. | 55/155 |
| 4,054,931 | 10/1977 | Bolton et al. | 360/97 |
| 4,268,878 | 5/1981 | Kearns | 360/97 |
| 4,329,722 | 5/1982 | West | 360/98 |
| 4,339,777 | 7/1982 | Gruczelak | 360/97 |
| 4,367,502 | 1/1983 | Iftikar et al. | 360/98 |
| 4,377,830 | 3/1983 | Patel | 360/98 |
| 4,396,964 | 8/1983 | Morehouse et al. | 360/98 |
| 4,488,193 | 12/1984 | Davis et al. | 360/98 |

FOREIGN PATENT DOCUMENTS 2247930  4/1973  Fed. Rep. of Germany ........ 360/98

OTHER PUBLICATIONS

Stickel, "New 50-Megabyte Disc Drive: High Performance and Reliability from High-Technology Design," Hewlett-Packard Journal, vol. 28, No. 12, (Aug. 1977).

Primary Examiner—A. J. Heinz
Assistant Examiner—Benjamin Urcia

[57] ABSTRACT

An internal pass-through air filtration system for a rotating memory having a recirculating air flow, such as a Winchester-type disk drive, uses a bipolar electrostatic filtering medium having a 0.3 micron filtering efficiency of approximately 50%–80%. An "electret" medium is preferred. Advantageously, the electret medium is pleated accordian-style to increase its mechanical strength and to reduce its projected area, thereby enabling it to be frictionally or otherwise seated in a relatively compact air filtration system, without the use of a supporting framework.

8 Claims, 1 Drawing Figure

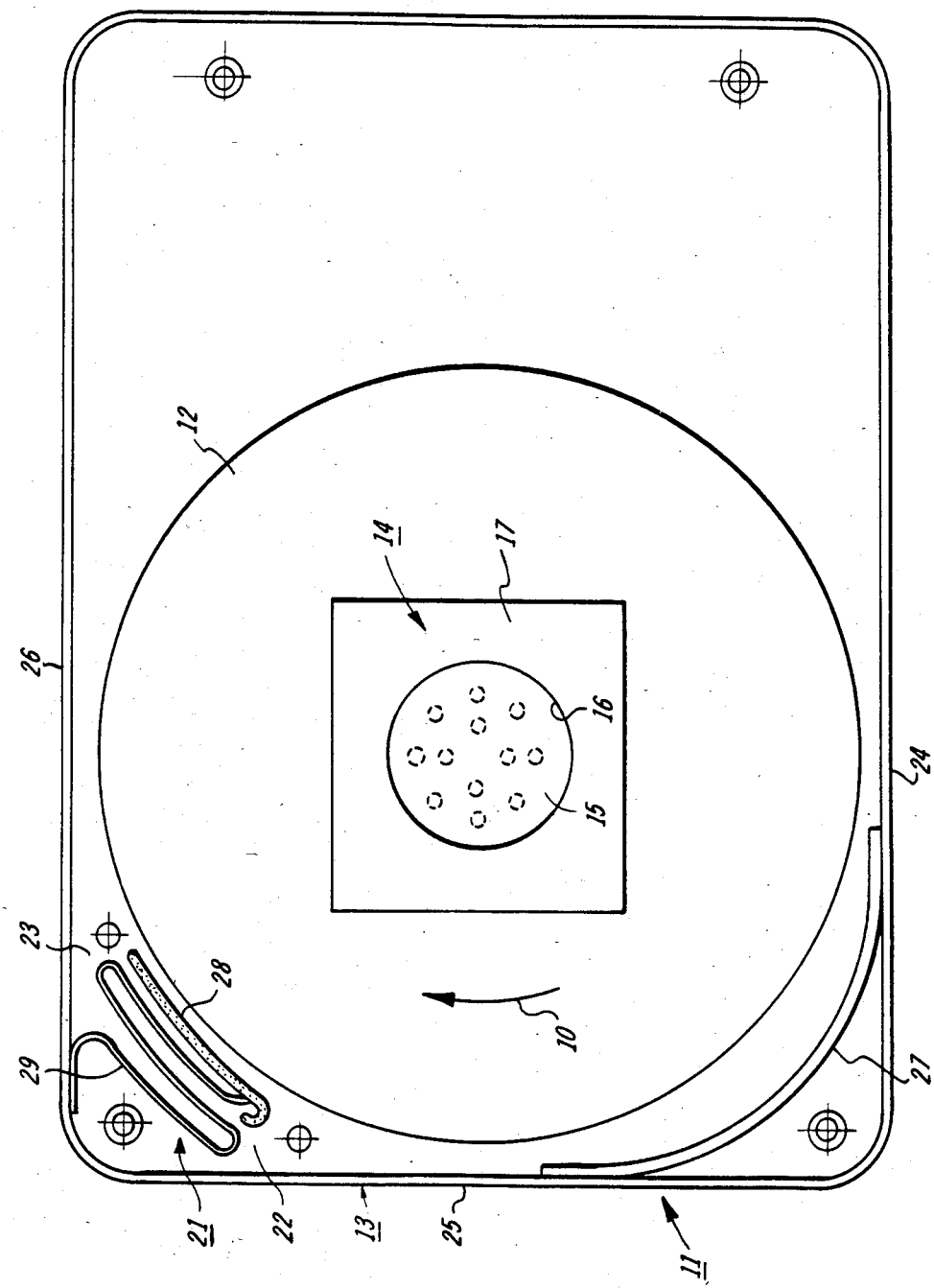

AIR FILTRATION SYSTEM FOR ROTATING DISK DRIVES HAVING RECIRCULATING AIR FLOWS

FIELD OF THE INVENTION

This invention relates to air filtration systems for rotating memories having recirculating air flows and, more particularly, to low resistance, pass-through air filtration systems for "Winchester-type" magnetic disk drives.

BACKGROUND OF THE INVENTION

As is known, Winchester-type fixed, rigid disk drives have recirculating air flow systems and have relatively little tolerance to the presence within such air flow of particulate material as small as a fraction of a micron because such particles may cause "head crashes" or otherwise damage the heads and/or disks. Indeed, the current industrial standard specification demands that the recirculating air contain no more than about 200 particles having a diameter of 0.3 microns or larger per cubic foot of air under steady state conditions. As will be appreciated, that is equivalent to a "Class 100" clean room environment.

Winchester disk drives conventionally are assembled and sealed in clean rooms, but an unacceptably high level of particulate contaminents is almost invariably introduced into the sealed enclosure or "bubble" of such a disk drive during the assembly process. Thus, the accepted practice is to include an internal air filtration system within such a disk drive for bringing the level of particulates down to an acceptably low level during an initial "clean-up" operation of the disk drive. The drive is at risk of a potentially catostrophic failure on account of an excessively high contaminent level while the clean-up operation is being performed. Thus, it is noteworthy that prior filtration systems typically have required as long as ten minutes or so to complete the clean-up process.

There are at least three distinct varieties of internal, pass-through air filtration systems for Winchester-type disk drives, each with its own advantages and disadvantages. Some drives, such as the Shugart 1000, have a filter mounted within a sealed plenum through which the recirculating air is forced to pass. This so-called "forced loop" approach is attractive because the air does not easily bypass the filter, but it has the disadvantages of requiring extra space, being relatively costly to implement, increasing the power consumption of the drive, and requiring careful sealing of the plenum. Other drives, such as the Shugart 1100, develop relatively high and relatively low static pressures at the inlet and outlet, respectively of the filter, so that the recirculating air is urged through the filter without the benefit of a sealed plenum. This "push-pull" approach is less efficient than a forced loop air filtration system because air can easily bypass or "blow-by" the filter, but it requires less space, is less costly to implement, reduces the power consumption and avoids the plenum sealing problems. Still other drives, such as the Seagate 412 and 506, simply develop a relatively high static pressure at the inlet of the filter for pushing the recirculating air through the filter. This "push-only" approach is the least efficient air handling technique, but it is a workable solution for drives involving certain spatial constraints.

A common characteristic of the existing pass-through air filtration systems for Winchester disk drives is that they employ a highly efficient mechanical filtering medium, even though such a filter inherently has substantial air flow resistance. For example, in view of the current state of the art, a conventional specification for such a filtration system would typically require a fiberglass filtering medium having a 0.3 micron mechanical filtering efficiency of approximately 99.98%. Lower resistance, adhesion-type air filtration systems have been proposed for Winchester disk drives, such as in U.S. Pat. No. 4,001,892, which issued Jan. 4, 1977 on "Contaminant Trapping in Rotating Disk Devices," but nothing has been uncovered to suggest that disk drive designers have previously recognized that a relatively low efficiency filtering media can be used in pass-through air filtration systems.

SUMMARY OF THE INVENTION

In accordance with the present invention, an internal pass-through air filtration system for a rotating memory having a recirculating air flow, such as a Winchester-type disk drive, uses a bipolar electrostatic filtering medium having a 0.3 micron filtering efficiency of approximately 50%–80%. An "electret" medium is preferred. Thus, it is noted that electret filters, as applied to other applications, are described in Van Turnhout, J., Adamse, J. W. C., and Hoerneveld, W. J., "Electret Filters for High Efficiency Air Cleaning," *Journal of Electrostatics*, Vol. 8, 1980, pp. 369–379 and in "Method and Means for Removing Particulate Substances from Solid Surface Area by Means of Electret-Containing Material," *Research Disclosure*, 20051, Dec. 1980, pp. 573–574. To carry out this invention, the electret filter advantageously is pleated accordian-style to increase its mechanical strength and to reduce its projected area, thereby enabling it to be frictionally or otherwise seated in a relatively compact air filtration system, without the use of a supporting framework.

BRIEF DESCRIPTION OF THE DRAWING

Still other features and advantages of this invention will become apparent when the following detailed description is read in conjunction with the drawing, which is a simplified plan view of a Winchester-type disk drive having a push-pull, pass-through air filtration system constructed in accordance with the present invention.

DETAILED DESCRIPTION OF THE ILLUSTRATED EMBODIMENT

While the invention is described in some detail hereinbelow with specific reference to a certain embodiment, it is to be understood that there is no intent to limit it to that embodiment. On the contrary, the aim is to cover all modifications, alternatives and equivalents falling within the spirit and scope of the invention as defined by the appended claims.

Turning now to the drawing, there is a fixed, rigid disk drive 11 (shown only in relevant part) having a recirculating air flow system. For example, the disk drive 11 may be a so-called Winchester-type magentic disk drive in which one or more magnetic recording heads (not shown) "fly" very close to the surface or surfaces of one or more magnetic recording disks 12 on air bearings which are created when the disk or disks 12 are rotated at relatively high speed (e.g., 3600 r.p.m.) in the direction of the arrow 10. While only one disk 12 can be seen, it will be understood that one or more additional disks may be mounted coaxially with the disk 12 to be driven by the same spindle drive motor (not shown). There is, of course, a practical limit on the number of disks 12 that may be accomodated because of the axial displacement that must be maintained between them, but those considerations are beyond the scope of this disclosure. To simplify the description, it will be assumed that there is only a single disk 12, but that should not detract from the generality of this disclosure.

In keeping with accepted practices, the disk 12 is sealed within an enclosure 13, so that the rotation of the disk 12 causes the air within the enclosure 13 to recirculate around a more or less closed path. To maintain a suitably high pressure within the enclosure 13 even if some minor air leaks exist, a so-called breather filter 14 is provided for drawing outside "make-up" air into the enclosure 13. Suitably, the breather filter 14 comprises a high efficiency mechanical filtering medium 15 which extends across a small aperture 16 formed in the enclosure 13. The filtering medium 15 advantageously bridges an aperture in an adhesive backing support 17, so that the filtering medium 15 may be held in place by adhesively securing the backing 17 to the enclosure 13.

As will be appreciated, the rotating disk 12 functions as a relatively inefficient centrifugal air pump for circulating the air within the enclosure 13 and for drawing any required make-up air into the enclosure 13 via the breather filter 14. Vanes or the like (not shown) may be used, if desired, to supplement the air pumping efficiency of the disk 12, but the low resistance filtering that is provided by this invention virtually eliminates the need for any such supplemental air pumping means. Indeed, as a result of the low resistance filtering that has been provided, the thermal distribution requirements of the drive 11 are likely to determine the air pumping efficiency that is required. That, of course, is a significant departure from the classical air flow design constraints for Winchester-type disk drives.

The disk drive 11 has push-pull internal air filtration system 21 at one corner (i.e., the upper left-hand corner as viewed) of the enclosure 13. To enable the rotation of the disk 12 to create relatively high and relatively low static pressures at the inlet 22 and the outlet 23, respectively, of the air filtration system 21, the enclosure 13 is sized and the disk 12 is positioned therein, so that there are relatively small clearances between the disk 12 and the sidewalls 24, 25 and 26 of the enclosure 13. Moreover, there is an arcuate corner baffle 27 extending between the two upstream sidewalls 24 and 25 for confining the air to the immediate vicinity of the disk 12 as it flows towards the air filtration system 21, and another arcuate baffle 28 for accelerating the air that flows between the disk 12 and the air filtration system 21. As will be understood, the air flow accelerates as it passes through the constricted region that is bounded on one side by the disk 12 and on the opposite side by the sidewalls 24 and 25 and the corner baffle 27, thereby creating a realtively high static pressure at the inlet 22 of the filtration system 21. Likewise, the air flow accelerates as it passes through the constricted region that is bounded by the disk 12 and by the combination of the baffle 28 and the sidewall 26, thereby creating a realtively low static pressure at the outlet 23 of the filtration system 21. Accordingly, air is pushed through the filteration system 21 from the inlet side 22 and drawn or pulled therethrough from the outlet side 23.

In accordance with the present invention, a low resistance, bipolar electrostatic filtering medium 29 having a 0.3 micron filtering efficiency of about 50%–80% is employed in the air filtration system 21, so that many of the larger particles are mechanically entrapped while the smaller particles are electrostatically captured. It has been found that a electret medium having a filtering efficiency toward the upper end of that range and a surface area of about 2.5–3.0 in.$^2$ reduces the particulate continents within the enclosure of a half-height, 5.25", Winchester-type disk drive (i. e., the Shugart 706/712) to an acceptably low level (i. e., no more than 200 particles having a diameter of 0.3 microns or larger per cubic foot of air) during a clean-up period which seldom exceeds three minutes. That compares to a clean-up period of as long as ten minutes or so that is usually required for a conventional high efficiency mechanical filter to achieve the same result.

The rapid clean-up provided by the electret filtering medium 29 is surprising in view of its relatively low efficiency, but it was recognized that the recirculating air flow within such a disk drive allows for a tradeoff between filtering efficiency, on the one hand, and air flow resistance, on the other. The resistance of an 80% efficient electrete filter is so much lower than the resistance of a standard 99.98% efficient mechanical filter that the reduced efficiency of the electrete filter is more than offset by the increased air flow therethrough. For example, the resistance of such an electrete filter is at least an order of magnitude less than the resistance of such a mechanical filter, but it only requires a five times greater air flow through the electrete filter to achieve substantially the same level of filtering that the mechanical filter provides because $1-(1-0.8)^5=0.9997=99.97\%$. In view of this example, it will be understood that 80% is not an absolute upper limit on the efficiency of the filtering medium 29. It is, however, a rough approximation of the 0.3 micron electrete filtering efficiency that more or less minimizes the clean-up time required for a Winchester disk drive. Similarly, it will be evident that 50% is not an absolute lower limit on the efficiency of the filtering medium 29. Instead, it is a rough approximation of the 0.3 micron electrete filtering efficiency that results in a tolerably brief (no longer than about ten minutes) clean-up period for such a disk drive. There are, of course, additional factors that enter into determining the clean-up time required, including the surface area of the filter 29 and the air moving capacity of the disk drive 11, but the 50%–80% 0.3 micron filtering efficiency range is generally appropriate for most practical applications of the present invention.

As iilustrated, the filtering medium 29 is pleated accordian-style, so that it has sufficient mechanical strength to be self-supporting and so that it fits within the compact confines of the air filtration system 21. Preferably, the filtering medium 29 is frictionally seated within the filtration system 21 merely by virtue of frictional contact, such as by compressing it between the sidewall 26 and the baffle 28, as shown. Alernatively, however, it may be mechanically secured in place, such as by adhesively bonding its opposite ends to the sidewall 26 and the baffle 28. While a self-supporting or frameless electrete filtering medium 29 is clearly preferred from a manufacturing cost point of view, the filtering medium 29 may be supported by a frame if desired.

CONCLUSION

In view of the foregoing, it will be apparent that the present invention provides improved pass-through air filteration systems for rotating memories having recirculating air flows. While the invention has been described in the context of a Winchester-type disk drive having a push-pull air filtration system, it will be understood that it is generally applicable to pass-through air filtration systems for rotating memories having recirculating air flows.

What is claimed is:

1. In a rotating disk memory having a pass-through air filtration system for removing particulates from a recirculating air flow, the improvement characterized by said air filtration system including a bipolar electrostatic filtering medium having a 0.3 micron filtering efficiency no greater than approximately 80%.

2. The improvement of claim 1 wherein
said filtering medium is an electret medium.

3. The improvement of claim 2 wherein
said rotating memory is a fixed, rigid magentic disk drive having a sealed enclosure for confining said air flow, and at least one recording disk mounted for rotation within said enclosure, and
said air filtration system is supported within said enclosure for establishing approximately a Class 100 environment within said enclosure.

4. The improvement of claim 3 wherein
the 0.3 micron filtering efficiency of said electret medium is between approximately 50% and approximately 80%, and
said medium is selected to create at least a Class 100 environment within said enclosure during an initial clean-up period of operation of said disk memory, said period being no longer than approximately ten minutes.

5. The improvement of claim 3 wherein
said recording disk functions as an unassisted centrifugal air pump for creating said recirculating air flow whenever said disk is rotating.

6. The improvement of claim 3 wherein
said electret filtering medium is frameless and is pleated accordian-style.

7. The improvement of claim 6 wherein
the 0.3 micron filtering efficiency of said electret medium is between approximately 50% and approximately 80%, and
said medium is selected to create at least a Class 100 environment within said enclosure during an initial clean-up period of operation of said disk memory, said period being no longer than approximately ten minutes.

8. The improvement of claim 7 wherein
said electret filtering medium is frictionally seated within said filtration system.

* * * * *